United States Patent [19] [11] 3,940,344
Yokogawa et al. [45] Feb. 24, 1976

[54] METHOD OF PRODUCING ACTIVATED CARBONS FROM PETROLEUM HEAVY MATERIALS IN A REACTION SOLVENT WITH A SULFONATING AGENT

[75] Inventors: Akira Yokogawa, Kasukabe; Mitsuyuki Mitooka; Kenji Shima, both of Soka, all of Japan

[73] Assignee: Maruzen Oil Co., Ltd., Osaka, Japan

[22] Filed: Sept. 13, 1973

[21] Appl. No.: 397,208

[30] Foreign Application Priority Data
Sept. 14, 1972 Japan............................... 47-92551

[52] U.S. Cl. .................. 252/422; 106/274; 208/44; 252/421; 252/425; 423/449
[51] Int. Cl.² ..................... C01B 31/12; C01B 31/10
[58] Field of Search ........... 252/422, 425, 444, 445, 252/421; 423/449, 445; 106/274, 275; 208/6, 44

[56] References Cited
UNITED STATES PATENTS

| | | | |
|---|---|---|---|
| 1,711,449 | 4/1929 | Cunningham et al............... | 106/274 |
| 2,809,938 | 10/1957 | Goren et al.......................... | 252/444 |
| 2,900,351 | 8/1959 | Goren et al.......................... | 252/422 |
| 2,911,373 | 11/1959 | Goren et al.......................... | 208/22 |
| 3,248,303 | 4/1966 | Doying................................ | 252/422 |
| 3,338,854 | 8/1967 | Hedge et al......................... | 208/44 |
| 3,509,038 | 4/1970 | Corbett.............................. | 106/274 |
| 3,558,276 | 1/1971 | Otani.................................. | 423/449 |
| 3,663,171 | 5/1972 | Granger.............................. | 252/421 |
| 3,775,344 | 11/1973 | Amagi et al. ....................... | 252/444 |

FOREIGN PATENTS OR APPLICATIONS
1,089,139   3/1955   France................................ 252/422

Primary Examiner—Winston A. Douglas
Assistant Examiner—P. E. Konopka
Attorney, Agent, or Firm—Sughrue, Rothwell, Mion, Zinn & Macpeak

[57] ABSTRACT

A method of producing granular or lumpy hard raw materials for activated carbon with a high yield by reacting a petroleum heavy material, such as a petroleum heavy oil or heavy residue, with a sulfonating agent in a reaction solvent thereby converting the petroleum heavy material into a carbonized material.

32 Claims, No Drawings

METHOD OF PRODUCING ACTIVATED CARBONS FROM PETROLEUM HEAVY MATERIALS IN A REACTION SOLVENT WITH A SULFONATING AGENT

BACKGROUND OF THE INVENTION

1. Field of the Invention

The present invention relates to a method of producing raw materials for activated carbon from petroleum heavy materials and, more particularly, it relates to a method of producing raw materials for activated carbon by the reaction of petroleum heavy materials such as petroleum heavy oils or petroleum heavy residues with a sulfonating agent.

2. Description of the Prior Art

Hitherto, raw materials for activated carbon have been produced by dry distilling in a fixed bed a woody carbonaceous material such as coconut shells and sawdust or a coal carbonaceous material at temperatures lower than about 600°C. Then, the raw materials for activated carbon thus obtained are activated with an activating gas, such as a steam-containing gas and a carbon dioxide-containing gas, at temperatures of about 700°C to about 1100°C to provide activated carbon. On the other hand, when asphalt or a petroleum heavy material containing a large asphalt content is subjected to the aforesaid solid-bed dry distillation-activation step which is a conventional method of producing activated carbon, only activated carbon with a greatly inferior quality is obtained. Also, the so-called raw petroleum cokes, that is the heavy material obtained by subjecting a petroleum heavy material to low-temperature coking or cracking, only gives an activated carbon with a greatly inferior quality using an ordinary activation method. Furthermore, in the case of using those petroleum heavy materials as raw materials, the yield for the raw materials for activated carbon obtained by the dry distillation of them is as low as about 30% and further the activated carbon obtained from such raw materials for activated carbon is low in bulk density and is brittle.

As a method of overcoming the disadvantages of the above-mentioned method, an improved method of producing activated carbon from a petroleum heavy material is disclosed in the specification of U.S. Pat. No. 2,809,938, in which asphalt is treated with concentrated sulfuric acid, the product is carbonized by dry distilling the product at about 500°C in the absence of oxygen to remove substantially all unreacted sulfuric acid and volatile matter, and then the carbonized product is activated at a high temperature using an activating gas. The method of the aforesaid patent may be excellent in that a practically useful activated carbon can be produced using petroleum heavy materials as raw materials but since the method requires a dry distillation and carbonization steps, from the standpoint of the amount of heat required, it is economically disadvantageous and further the activated carbon produced only has properties inferior to the properties of commercially available conventional activated carbon. The reason that the properties of the activated carbon produced by the method of the above-cited U.S. Pat. No. 2,809,938 is believed to be as follows: That is, in the method the structure of the material to be converted into a porous material in the subsequent activation step is damaged in the dry distillation step for removing the volatile matter.

Also, in the specification of Japanese patent publication No. 6818/56, a method is described for producing activated carbon by dry distilling the sulfuric acid sludge or sulfuric acid pitch produced as by-products in the refining of oils with sulfuric acid at temperatures of 500°–700°C while introducing steam to the system to remove substantially all of the volatile matter and then activating the product with an activating gas. The Japanese Patent specification also teaches that since sulfuric acid pitch contains a large amount of impurities containing actively deleterious materials, an activated carbon of good quality cannot be obtained without dry distilling the sulfuric acid pitch at 500°–700°C while introducing steam into the system for removing those actively deleterious materials and that if the temperature for the dry distillation is lower than 500°C or higher than 700°C, a high quality activated carbon is not obtained. Thus, this method requires a dry distillation step as a necessary factor and hence is economically disadvantageous from the standpoint of the heat required, and further the activated carbon produced only has the same properties as those of commercially available activated carbon.

Also, in "Hydrocarbon Processing", January, 105-108 (1971), a method is described of producing activated carbon by impregnating raw petroleum coke with a mixture of sulfuric acid and phosphoric acid but from the experimental results described in the report, the properties of the activated carbon produced by the method are inferior to those of commercially available activated carbon.

SUMMARY OF THE INVENTION

The inventors have discovered, as the result of investigations on overcoming those problems discussed above, that carbonaceous materials which can be converted by activation into activated carbon having an excellent quality are obtained by treating petroleum heavy materials with a sulfonating agent. However, by simply treating petroleum heavy materials with a sulfonating agent, the carbonized materials thus obtained are insufficient in hardness, unsuitable for producing granular activated carbon or pulverized activated carbon, and hence the use of the carbonized materials is restricted. Also, this method has the disadvantages that the amount of sulfuric acid used is comparatively large and hence the production cost is higher and in the treatment with sulfuric acid the surface of the reaction mixture raises locally caused by foaming during the step of reaching the reaction temperature, which makes it difficult to continue the reaction further.

As the results of further conducting these investigations, the inventors have discovered that by conducting the treatment of petroleum heavy materials with a sulfonating agent in an reaction medium, the carbonized materials are obtained as a granules or lumps suitable for producing granular activated carbon or pulverized activated carbon, the yield is high, the amount of sulfonating agent used is small, and further the reaction can be simplified.

An object of this invention is, therefore, to provide a method of producing carbonized materials in high yield from petroleum heavy materials, that is raw materials for producing activated carbon having excellent quality by activation.

Another object of this invention is to provide a method of producing the above-described raw materials in a granular or lump form.

Still another object of this invention is to provide a method of producing the above-described raw materials in a high yield using a small amount of sulfonating agent.

Further an object of this invention is to provide a simplified reaction method for producing the above-described raw materials.

The objects of this invention can be attained by treating petroleum heavy materials with a sulfonating agent in a reaction medium, that is, by reacting the petroleum heavy materials with a sulfonating agent in a reaction medium to convert them into carbonized materials.

DETAILED DESCRIPTION OF THE INVENTION

The petroleum heavy materials used in this invention are petroleum heavy oils or heavy residues. These materials can be obtained by distilling, extracting, or decomposing (in the presence or absence of a catalyst) petroleum hydrocarbons. More specifically, the petroleum heavy materials used in the present invention are solids at normal (room) temperature or liquids having a kinematic viscosity higher than 100 centistokes at 50°C. These materials preferably contain more than 70% by weight of carbon and not more than 0.1% by weight of total metal content. Examples of these petroleum heavy materials include the heavy materials obtained by distilling crude oil; the heavy materials obtained by extracting crude oil with solvents, the residue obtained in normal-pressure distillation of crude oil, or the distilled oils obtained from reduced-pressure distillation of crude oil; the heavy materials obtained by decomposing crude oil at an increased temperature, the distilled oils obtained from normal-pressure or reduced-pressure distillation of crude oil, or the distillation residues thereof; and the heavy materials obtained by further decomposing at increased temperatures the heavy materials obtained in the case of extracting crude oil with solvents, the residues in normal-temperature distillation of crude oil, or the distilled oils from reduced-pressure distillation of crude oil. Specific examples of these materials are straight asphalt, heavy oil, blown asphalt, cut back asphalt, asphalt recovered on deasphalting with a solvent, the catalytic decomposition residues of kerosene or light oil, the thermal decomposition residues of kerosene or light oil, the decomposition residues of naphtha, the residues obtained in the case of coking, thermally decomposing, gasifying, or hydrocracking heavy fractions or residual oils, petroleum pitch, and petroleum cokes. Of the above-described materials, the asphaltic materials are particularly excellent as the raw materials in this invention because they have excellent properties such as infusibility, hardness, shapes, i.e., granules or lumps, etc., necessary as the raw materials for producing active carbon and further they can provide, easily and with high yield under comparatively mild conditions, high molecular weight hydrocarbons which can provide activated carbon having a high specific surface area and a high adsorptive power to methylene blue. These above-described materials can be used individually or as a mixture thereof or as a mixture with coal or other woody materials. When a mixture of the above-described materials and other materials such as coal or woody materials are used, any mixing ratios can be employed but generally it is desirable that the proportion of the other materials be less than about 50%, preferably from 0 to 20% by weight to the heavy materials described above. If the proportion thereof is higher than about 50% by weight, the activated carbon obtained on activation is inferior in specific surface area and adsorptive power in the case of using coal as the other material in the mixture although the physical strength of activated carbon is increased and also the strength of activated carbon obtained tends to be reduced in the case of using a woody material as the other material in the mixture.

Woody materials are insoluble in solvents and hence they are used as powders. The addition of coal increases further the physical strength of activated carbon produced and further the coal thus added becomes the nuclei for the granulation of the product. On the other hand, by the addition of a woody material, the reaction can be conducted under mild conditions. That is, the reaction temperature can generally be reduced by about 20° – 30°C by the addition of a woody material.

Any sulfonating agents capable of sulfonating the petroleum heavy materials can be used in this invention for reacting with the above-described raw materials. Specific examples of such sulfonating agents include sulfuric acid; fuming sulfuric acid; sulfur trioxide; a complex salt of sulfur trioxide; and a basic compound such as pyridine, dioxane, trimethylamine, dimethylaniline, thoxane, bis(2-chloroethyl) ether, 2-methylpyridine, quinoline, dimethylformamide, triethyl phosphate, etc.; a complex salt of chlorosulfonic acid and a weakly basic material such as diethyl ether, dioxane, dimethylformamide, etc.; a fluorosulfonic acid; a sulfaryl chloride; sulfamic acid; an acyl sulfate such as monoacetyl sulfate, diacetyl sulfate, etc.; an alkyl sulfate such as dimethyl sulfate, etc., and sulfonic acid.

These sulfonating agent is desirably free from water since if the sulfonating agent contains water, the reactivity is reduced. For example, where sulfuric acid is used as the sulfonating agent, it is desired that the concentration of the sulfuric acid be higher than 77% by weight. If the concentration of the sulfuric acid is less than 77% by weight, the yield for the product becomes less than 100% by weight to the amount of the raw materials. Additionally the product becomes viscous and is fused in the activatin step, which makes it difficult to produce activated carbon therefrom. On the other hand, where the concentration of the sulfuric acid is higher than 77% by weight, the yield of the product increases as the concentration increases and thus an infusible product is obtained.

Of the aforesaid sulfonating agents, the most effective sulfonating agents for providing high yield and an infusible product are fuming sulfuric acid and sulfur trioxide. Concentrated sulfuric acid and chlorosulfonic acid are also excellent for the purpose although the amount thereof must be increased. Furthermore, if sulfur trioxide is used in the form of the complex salt as described above, it contributes to prevent the dispelling of the sulfur trioxide.

The proportion of the sulfo group in the raw material for activated carbon, that is, the carbonized material to be activated obtained by the treatment with the sulfonating agent, influences the formation of fine holes in the activation step, the hardness of the carbonized product, and the shape (degree of granulation) of the carbonized product. In other words, if the sulfo group is absent or the proportion of the sulfo group is too high, activated carbon of good quality cannot be obtained. However, in order to make the carbonized product infusible, it is necessary to conduct the reaction for forming high molecular weight compound by oxidation or dehydropolycondensation rather than conducting sulfonation. Therefore, the sulfonating agent must have, as a first characteristic, a sulfonation capability and further, as the second characteristic, the ability to cause oxidation or polycondensation. In general, a material having high sulfonation capability is at the same time effective for oxidation or polycondensation but even in the case of using a sulfonating agent having weak sulfonation ability, the objects can be attained by employing severe reaction conditions. Also, in the case of using, for example, chlorosulfonic acid as the sulfonating agent, a halogenation reaction occurs, whereby the above-described advantage can be obtained. Furthermore, in order to achieve the sulfonation reaction and the oxidation reaction simultaneously, a mixture of the sulfonating agent and an oxidizing agent such as potassium permanganate and nitric acid can be used.

Examples of reaction mediums used in the reaction of the petroleum heavy materials and the sulfonating agents as stated above, in which the raw materials can be dissolved or dispersed therein are halogenated lower aliphatic compounds (such as chloroform, dichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, tetrachloroethylene, fluorochloroethanes, chloropropanes, dichloropropanes, trichloropropanes, etc.,), lower fatty acids (such as acetic acid, propionic acid, chloroacetic acid, trichloroacetic acid, etc.,), phenols (such as o-nitrophenol, p-cresol, etc.,), oxidized nitrogen compounds (such as nitromethane, nitrobenzene, etc.,), oxygen-containing compounds (such as ethers, e.g., dioxane, tetrahydrofuran, ethyl ether, thioxane, etc., ketones, e.g., acetone, acetophenone, etc., amides, e.g., dimethylformamide, etc.,), carbon disulfide, alphatic hydrocarbons (such as n-hexane, etc.,), aromatic hydrocarbons (such as benzene, etc.,) and the like. Of these materials, the lower aliphatic halogen compounds are preferable from the standpoint of the solubility of the petroleum heavy materials, stability toward the sulfonating agents, stability to heat, and their vapor pressure permits easy recovery by distillation.

As described above, according to the method of this invention, carbonized materials are obtained by conducting the reaction of the petroleum heavy materials and the sulfonating agents in the presence of the reaction mediums (hereinafter, this reaction will be called "pretreatment" for brevity). There are no particular restrictions on the reaction temperature because the sulfonation and curing or carbonization can proceed even at room temperature (e.g., about 20° – 30°C) but the reaction of this invention is generally conducted at temperatures of 0° to 300°C. If the temperature is lower than 0°C, the yield for the product decreases, while if the temperature is higher than 300°C, the product tends to become brittle.

In the case of using sulfur trioxide or fuming sulfuric acid, it is preferable to conduct the reaction at temperatures lower than 200°C, since if the reaction is conducted, in this case, at temperatures higher than 200°C, the formation of $SO_2$ becomes marked disturbing the progress of the sulfonation reaction required and reducing the reaction efficiency and further corrosion of the reaction system increases greatly.

In the method of this invention, the most preferable reaction temperatures are from 50° to 150°C. That is, in this temperature range, a hard product can be obtained with a high reaction efficiency. Furthermore, in this temperature range, carbonized products suitable for providing excellent activated carbon having a large specific surface area and a high adsorption power to methylene blue as described hereinafter can be easily obtained. In this case, although the detailed reasons are somewhat unclear, it is believed that by the treatment with the sulfonating agent, the petroleum heavy material undergoes a dehydropolycondensation reaction forming the hardened or carbonized material.

In the method of this invention it is necessary to conduct the reaction with the sulfonating agent until the product has a softening point of such an extent that the product is not softened by the activation treatment. Furthermore, since the treating temperature is about 600°C in the case of activating the product with zinc chloride, the reaction is continued until the softening point of the reaction product becomes higher than 700°C, preferably higher than 800°C. Also, since the treating temperature is higher than 800°C in the case of activating the product with steam, the reaction is continued until the softening point of the reaction product becomes higher than 900°C, preferably higher than 1000°C. There is no strict limitation on the upper limit of the above-described softening point but the upper limit is generally 1500°C, preferably 1200°C.

As described above, the reaction period of time in the method of this invention is determined by the softening point required for the product, but it can be selected by the following manner:

That is, the rate of reaction of the petroleum heavy materials and the solfonating agent is high and hence the sulfonation reaction proceeds sufficiently within 30 minutes and also materials suitable for ion-exchange use can be easily obtained but the softening point of the product is low. Because a main object of this invention is to provide a method of producing infusible raw materials for activated carbon as stated above, it is necessary to cause the oxidation or the polycondensation for not only the sulfonation but also to provide an infusible product. The rate of the oxidation or the polycondensation is lower than the sulfonation reaction and thus for producing the desired raw materials for activated carbon, it is preferable that the reaction period of time be much longer. The reaction period of time for increasing the softening point of the product as described above depends upon the nature of the materials to be used in this reaction and other reaction conditions but is generally from 30 minutes to 10 hours. If the reaction period of time is shorter than 30 minutes, it is difficult as described above to obtain a product having the hardness and infusibility necessary for the raw materials for activated carbon. On the other hand, if the reaction period of time is longer than 10 hours, the oxidation reaction proceeds to too great an extent forming a brittle product and also the yield for the product tends to decrease in this case. The preferable range of the reaction period of time in the method of this invention is from about 1 hour to about 5 hours although it differs somewhat according to the nature of the sulfonating agent. In the range of reaction period of time, a hard product can be obtained with a high yield and also the activated carbon prepared from the raw material thus prepared has an excellent quality. In the case of recovering the reaction medium or solvent by distillation after the reaction is over, the sulfonating agent is partially present and thus the reaction proceeds yet in this case. Therefore, the distillation period of time is also considered a part of the reaction period of time.

Although the influences of the kind of the sulfonating agent on the properties of the product having the highest bulk density and then sulfur troxide and sulfuric acid follows fuming sulfuric acid in this order. As the amount of the sulfonating agent increases, the yield of the product increases in proportion to the increased amount of the sulfonating agent. The amount of the sulfonating agent is generally 0.2 to 20 times by weight of that of the petroleum heavy material. The specific surface area, the adsorptive power to methylene blue, and the bulk density of the product tend to increase as the amount of the sulfonating agent increases with each of them becoming maximum when the amount of the sulfonating agent is less than 10 times by weight of that of the petroleum heavy material. If the amount of the sulfonating agent is too small, a carbonized product which can be activated cannot be obtained, while if the amount of the sulfonating agent is too large, the product becomes brittle and further the yield thereof is reduced.

The optimum range of the amount of the sulfonating agent can easily be determined experimentally. For example, the amount of sulfur trioxide is generally 0.2 to 10 times by weight, preferably 0.5 to 7 times by weight, more preferably 1.0 to 3.0 times by weight that of the petroleum heavy material. The amount of fuming sulfuric acid is generally 0.5 to 10 times by weight, preferably 1.0 to 7 times by weight, more preferably 1.5 to 5.0 times by weight. The amount of sulfuric acid or chlorosulfonic acid is generally 1.0 to 2.0 times by weight, more preferably 5.0 to 7.0 times by weight. Furthermore, in the case of using potassium permanganate as an oxidizing agent together with the sulfonating agent in the pre-treatment, it is preferable to use 5 to 20% by weight potassium permanganate to the amount of the petroleum heavy material since if the amount of the oxidizing agent is too large, a large amount of manganese is included as ash in the activated carbon. Also, in the case of using nitric acid as the oxidizing agent together with the sulfonating agent, it is preferable that the amount of nitric acid be less than the equivalent of 96% $H_2SO_4$ since if the amount is too large, the melting point of the product is lowered reducing the infusibility thereof.

The sulfonating agent once used can be recovered for reuse. Also, the amount of the reaction medium which acts as a dispersing agent for the reactants can be readily determined experimentally. It is desired to use the reaction medium in an amount sufficient as a dispersing agent for dispersing and dissolving the petroleum heavy material and the sulfonating agent but the reaction medium can be present together with the reactants. The amount of the reaction medium is generally 0.2 to 30 times by weight, preferably 5 to 20 times by weight, more preferably 7 to 10 times by weight that of the petroleum heavy material. If the amount of the reaction medium is less than 0.2 times by weight that of the petroleum heavy material, the effect of using the reaction medium, that is the increase in reaction yield and the increase of the hardness of product are not remarkable. On the other hand, even if the amount of the reaction medium is higher than 30 times by weight, no adverse influences on the properties of the product are obtained and the use of such a large amount of the reaction medium is unnecessary.

Because the reaction medium is only slightly consumed in the pre-treatment, the reaction medium can be recovered and reused. If an appropriate reaction medium having a boiling point near the reaction temperature is used, the reaction medium can be recovered by distillation during reaction. A reaction medium having a boiling point lower than the reaction temperature can be used but in this case it is preferable to conduct the reaction while refluxing the reaction medium into the reaction system.

The carbonized product obtained by the treatment with the sulfonating agent in the pre-treatment step is, after the reaction is over, cooled after distilling off the reaction medium or solvent or without removing the solvent. When the product is cooled to room temperature, it is immersed in water and the solid materials are recovered by filtration. By washing well with water and drying the recovered product, the carbonized material for activated carbon is obtained. Or, alternatively, after distilling off the reaction medium, the reaction product is further heated to 150° to 300°C, more preferably 180° to 250°C, for 1 to 3 hours with stirring to decompose and remove the remaining sulfonating agent and then the reaction product is dried as it is to provide the carbonized material for activated carbon.

From the carbonized product thus obtained, activated carbon can be obtained by a conventional activation method, that is, using a steam activation method or a zinc activation method. It is to be noted that the raw material obtained in accordance with the method of this invention can be subjected to any known activation method to produce the desired activated carbon. A typical procedure of the steam activation method comprises feeding the raw material into a fluidized bed or fixed bed activation apparatus and activating the raw material at a temperature ranging from about 800° to about 900°C for a period of from about ½ to about 3 hours with steam in an amount of 1 to 20 times by weight the amount of the raw material fed. A typical procedure of the zinc activation method comprises activating the raw material with an activating agent, in an amount of 1 to 10 times by weight the amount of the raw material, comprising water, a zinc compound such as zinc chloride and concentrated hydrochloric acid at a temperature ranging from about 600° to about 700°C for a period of from about ½ to about 3 hours.

In a conventional method of producing raw materials for activated carbon by dry distilling and carbonizing petroleum heavy materials, the yield of the raw materials for activated carbon is only about 30% by weight but in the method of this invention, the yield of the raw material for activated carbon is quite high and is frequently over 100% by weight. For example, the yield of the raw material for activated carbon obtained in Example 1 hereinafter described has been found to be 131% by weight (the yield of activated carbon from the raw material is 32.1% by weight). Moreover, the specific surface area of commercially available activated carbon is ordinarily about 500 to 1000 m²/g but the specific surface area of the activated carbon obtained by activating the raw material for activated carbon prepared by the method of this invention sometimes is over 2000 m²/g, which shows the activated carbon from the raw material produced by the method of this invention is quite excellent. Furthermore, on considering that in the case of using the petroleum heavy materials as raw materials, the specific surface area of activated carbon produced by the conventional method comprising dry distillation step and activation step is less than 100 m²/g, it can be further seen that the method of this invention is a quite excellent method.

Still further, the bulk density of the activated carbon prepared from the petroleum heavy materials by the conventional method comprising a dry distillation step and an activation step is about 0.2 g/cc and the activated carbon is brittle, while the raw materials for activated carbon produced by the method of this invention can give by activation an activated carbon having a bulk density of higher than 0.35 g/cc and further an activated carbon having a bulk density of higher than 0.45 g/cc under the most preferred conditions. Also, in the conventional method, the dry distillation step and the activation step emit large amounts of black smoke, which is not desirable because of air pollution but in the method of this invention substantially no black smoke is emitted. Furthermore, because the raw material for activated carbon obtained by the method of this invention does not require dry distillation before activation, the employment of the method of this invention is economically advantageous in the production of activated carbon from the standpoint of the amount of heat required.

The raw material for activated carbon produced by the conventional method wherein the petroleum heavy materials are treated with a sulfonating agent in the absence of reaction medium is brittle and, although such a raw material may be suitable for producing powdery activated carbon, it is unsuitable for producing granular activated carbon or crushed activated carbon. On the other hand, the raw material for activated carbon obtained by the method of this invention wherein the petroleum heavy material is treated with a sulfonating agent in the presence of the reaction medium is obtained as a granular product or lumpy product, which can provide granular or crushed activated carbon, and thus the use of the raw material can be greatly widened. Also, in the method of conducting the pretreatment of the petroleum heavy material without using the reaction medium, the reactants expand due to foaming in the course of reaching the reaction temperature, which makes it difficult to continue the reaction further, while in the method of this invention such a phenomenon scarecely occurs and the reaction can be conducted in a stable manner. Moreover, as compared to the method of conducting the pretreatment without using the reaction medium, the method of this invention has such merits or advantages that the yields for the raw materials for activated carbon produced by the method and the activated carbon prepared by activating the raw materials are higher and further the amount of the sulfonating agent used in the reaction is less.

For the sake of comparison, the amount of the sulfonating agent necessary in the case of using the reaction medium and the amount of the sulfonating agent necessary in the case of obtaining a reaction product in the same yield as described above without using the reaction medium are shown in the following table.

| Sulfonating Agent | No Solvent | Solvent Used (10 times by weight to the amount of heavy oil) |
|---|---|---|
| 96% Sulfuric Acid | 5 wt. times to heavy oil | 2 wt. times |
| 60% or 25% Fuming Sulfuric Acid | 3 wt. times | 1 wt. times |
| Sulfur Trioxide | 1.5 wt. times | 0.5 wt. times |

As shown above, the amount of the sulfonating agent in this invention can be only about ⅓ of the amount necessary in the case of using no reaction medium.

Now, the invention will be explained in greater detail by reference to the following examples. Unless otherwise indicated, all parts and percents are by weight.

EXAMPLE 1

50 g of asphalt recovered in the case of deasphalting the reduced pressure distillation residues of Kuwait crude oil with propane was dissolved in 50 g of 1,1,2-trichloroethane. The asphalt used in this Example has the following properties:

| | |
|---|---|
| Penetration (at 25°C), | 15 |
| Softening Point, | 65.5°C |
| Viscosity (at 135°C), | 1160 c.p. |
| (at 160°C), | 320 c.p. |
| Specific Gravity (25/25°C), | 1.0576 |
| Asphaltene Content, | 21.8% by weight |
| Resins Content, | 72.3% by weight |
| Oils Content, | 5.7% by weight |
| Carbon Content, | 82.6% by weight |
| Metal Content (V, Ni, Na, Fe), | about 196 ppm |

500 g of 96% sulfuric acid was then added to the resulting solution and then the mixture was maintained at a reaction temperature of 100°C for 3 hours with stirring in a three-necked flask equipped with a condenser. In addition, the phenomenon of raising the surface of reactants caused by foaming did not occur in this case and the reaction system reached the desired temperature, 100°C, after about 30 minutes. After the reaction was over, the reaction product was poured in 500 g of water, the solid matter was separated from the liquid by filtration and, after washing with water, dried overnight at 120°C. The yield for the product was 131% by weight of the raw materials, the bulk density thereof was 0.609 g/cc, and also the product was obtained as a grossly granular material. When the product was subjected to a steam activation for 60 minutes at 850°C, an activated carbon having a specific surface area of 1700 m²/g, a methylene blue-adsorptive power of 430 mg/g, and a bulk density of 0.398 g/cc was obtained with a yield of 32.1% by weight to the asphalt. Also, the greater part of the activated carbon thus obtained was flat and hard granules having a major axis of 4 mm, a minor axis of 3 mm, and a thickness of about 1 mm.

The specific surface area of the activated carbon was measured by the B E T method. (The B E T method is a well-known method for measuring a surface area based on the adsorption theory established by Brunaner, Emmett and Teller. The measurement is generally based on the nitrogen adsorption.) Also, the methylene blue-adsorptive power of the activated carbon was calculated as follows: A suitable amount of 300 mg/liter of methylene blue solution in a buffer solution having a controlled pH of 7 and 0.2 g of the activated carbon sample were shaken for 30 minutes, the mixture was subjected to centrifugal separation, and then the amount of the adsorbed methylene blue was calculated from the amount of methylene blue remaining in the supernatant liquid.

COMPARISION EXAMPLE 1

The asphalt as described in Example 1 was subjected to a solid bed dry distillation for 8 hours at 450°C and then the product was activated for 90 minutes at 900°C using steam, whereby an activated carbon having a specific surface area of 61 m$^2$/g and a methylene blue-adsorptive power of 23 mg/g was obtained.

COMPARISON EXAMPLE 2

The same pre-treatment as described in Example 1 was employed except that the reaction medium was not used. That is, 50 g of the powdery asphalt was placed in a three-necked flask and after adding thereto 500 g of 96% concentrated sulfuric acid, the temperature of the reaction mixture was raised gradually up to the reaction temperature, 100°C while stirring the reaction system. Since there was a concern that the surface of the reaction mixture would be raised due to foaming and spill over the reaction vessel in this step, the temperature was raised quite gradually. Accordingly, it took 2 hours before the temperature of the reaction system reached 100°C. After conducting the reaction for 3 hours, the reaction product was poured into 500 g of water, the solid matter was separated from the liquid by means of a glass filter and then washed with water. The solid matter was dried overnight at 120°C. By the reaction, a powder product having a bulk density of 0.411 g/cc was obtained with a yield of 121% by weight to the asphalt. When the product was subjected to steam activation for 60 minutes at 850°C, a powdery activated carbon having a specific surface area of 1800 m$^2$/g, a methylene blue-adsorptive power of 500 mg/g, and a bulk density of 0.308 g/cc was obtained with a yield of 16.8% by weight to the asphalt. EXAMPLES 2–6

In Examples 2 and 3, the same procedure for producing activated carbon as described in Example 1 was conducted under the same conditions as described in Example 1 except that the dichloromethane and the 1,1,2,2-tetrachloroethane were used respectively as the reaction medium. Also, in Examples 4 and 5, the same procedure for producing activated carbon as described in Example 1 was followed except that the weight ratio of the reaction medium to the asphalt was 0.25/1 and 10/1, respectively.

In the pre-treatment step of Example 5, the reaction mixture was heated to the boiling point of 1,1,2-trichloroethane with stirring, the reaction was conducted while distilling off gradually the reaction medium, and the reaction was finished when the 1,1,2-trichloroethane was completely distilled off. The reaction period of time could be controlled by the rate of distilling off of the reaction medium but in this example the reaction period of time was 3 hours. The solid matter obtained by the pre-treatment as described in Example 1 was granules slightly larger in size than the solid matter obtained in Example 1 although the product of this invention was inferior in gloss as compared with the product in Example 1. The recovery yield for the 1,1,2-trichloroethane was 98% and although the recovered reaction medium contained certain amounts of sulfur dioxide gas and water, it could be used again after dehydration.

In Example 6, the activated carbon was produced in the same way as described in Example 1 except that the weight ratio of the reaction medium to the raw material was 10/1 and the weight ratio of the sulfonating agent to the raw material was 1.5/1.

In each the examples illustrated above, the reaction could be conducted easily, the yield of the activated carbon produced was high, and the activated carbon obtained was hard granules or lump ones. The results obtained in Examples 2–6 are shown in Table 1 below together with the results obtained in Example 1 described above and Comparison Examples 1 and 2 also described above.

COMPARISON EXAMPLE 3

A mixture of 50 g of asphalt as described in Example 1 and 100 g of 96% concentrated sulfuric acid was maintained at a reaction temperature of 115°C for 3 hours with stirring. After the reaction was over, the reaction product was poured in 200 g of water, the solid matter was separated from the liquid by filtration and dried overnight at 120°C. The yield for the product was 102% by weight to the asphalt. The solid matter thus recovered was treated in a fluidized bed-type activation apparauts but due to the insufficient treatment with the sulfonating agent, the product fused together and hence the activation was impossible. Thus, the amount of the sulfonating agent where no reaction medium was used was large than the case of Example 6 but desired results were not obtained. The results obtained are also shown in Table 1.

Table 1

|  | Example | 1 |  |  | 2 | 3 | 4 | 5 | 6 |  |
|---|---|---|---|---|---|---|---|---|---|---|
|  | Comparison Example |  | 1 | 2 |  |  |  |  |  | 3 |
|  | Sulfonating Agent |  |  |  |  | 96% Sulfuric acid |  |  |  |  |
|  | Sulfonating Agent/ Raw Material (w/w) | 10/1 | Dry distilled in fixed bed for 8 hrs. at | 10/1 | 10/1 | 10/1 | 10/1 | 10/1 | 1.5/1 | 2/1 |
| Pre-treatment Step | Reaction Medium | TCE(1) |  | — | Dichloromethane | 1,1,2,2-Tetrachloromethane | TCE | TCE | TCE | — |
|  | Reaction Medium/ Raw Material(w/w) | 1/1 |  | — | 1/1 | 1/1 | 0.25/1 | 10/1 | 10/1 | — |
|  | Reaction Temperature (°C) | 100 |  | 100 | 100 | 135 | 100 | 113–116 | 113–116 | 115 |
|  | Reaction Time (hr) | 3.0 |  | 3.0 | 5.0 | 3.0 | 3.0 | 3.0 | 3.0 | 3.0 |
|  | Reaction Product: Yield (wt%) | 131 |  | 121 | 127 | 133 | 129 | 138 | 140 | 102 |
|  | Bulk Density(g/cc) | 0.609 |  | 0.411 | 0.557 | 0.616 | 0.590 | 0.519 | 0.552 | 0.412 |
| Activation | Activation Temperature(°C) | 850 | 900 | 850 | 850 | 850 | 850 | 850 | 850 | 850 |
|  | Activation Time (hr) | 60 | 90 | 60 | 60 | 60 | 60 | 60 | 50 |  |
|  | Activated Carbon: Yield (wt%) (2) | 32.1 | — | 16.8 | 41.5 | 27.7 | 32.9 | 23.5 | 26.6 |  |

Table 1-continued

| | Example | 1 | | | 2 | 3 | 4 | 5 | 6 | |
|---|---|---|---|---|---|---|---|---|---|---|
| | Comparison Example | | 1 | 2 | | | | | | 3 |
| vation Step | Specific Surface Area (m²/g) | 1700 | 61 | 1800 | 1300 | 1800 | 1500 | 1900 | 1500 | |
| | Methylene Blue Adsorptive Power (mg/g) | 430 | 23 | 500 | 220 | 470 | 350 | 480 | 390 | |
| | Bulk Density(g/cc) | 0.398 | — | 0.308 | 0.391 | 0.409 | 0.459 | 0.338 | 0.360 | |

(1) TCE means 1,1,2-trichloroethane(same abbreviation used in Tables 2–3).
(2) Yield to the petroleum heavy material(same in Tables 2–5).

As is clear from the results contained in Table 1, in Examples 1 to 6 activated carbons having a higher bulk density and hardness were obtained with higher yields as compared with the case of Comparison Example 2. Furthermore, the activated carbons produced in the above-described examples had almost the same specific surface area and properties as those of the activated carbon obtained in Comparison Example 2. For comparison, the specific surface area of commercially available activated carbon is about 500–1000 m²/g.

EXAMPLE 7

In 500 g of 1,1,2-trichloroethane was dissolved 50 g of asphalt as described in Example 1 and then 150 g of 2.5% fuming sulfuric acid was added to the solution over a period of 30 minutes from a dropping funnel. Thereafter, the reaction was conducted while maintaining the reaction system at the boiling point of the reaction solvent, 1,1,2-trichloroethane, while the reaction solvent was distilled off over a period of three hours. After the reaction was over, the reaction product was poured in 200 g of water and then the solid matter was separated from the liquid by filtration. Then, the solid product was dried overnight at 120°C. The yield for the product was 134% by weight to the asphalt, and the bulk density thereof was 0.551 g/cc. By subjecting the product to a steam activation for 60 minutes at 900°C, flat granular activated carbon having a specific surface area of 1700 m²/g and a bulk density of 0.387 g/cc was obtained with a yield of 30.2% by weight to the asphalt.

EXAMPLE 8

Activated carbon was produced in the same way as described in Example 7 while using 60% fuming sulfuric acid as the sulfonating agent. In this example granular activated carbon was obtained with good yield.

EXAMPLE 9

In 500 g of 1,1,2-trichloroethane was dissolved 50 g of asphalt as described in Example 1 and, while maintaining the solution at 90°C, air saturated with sulfur trioxide by passing the air through a layer of 25% fuming sulfuric acid was blown into the solution at a rate of about 400 ml/min to conduct the reaction for 3 hours. In this case, the amount of sulfur trioxide thus introduced was 105 g. After the reaction was over, the reaction product was poured in 200 g of water. Then, the solid matter was separated from the liquid by filtration and dried overnight at 120°C. The yield for the product was 145% by weight to the asphalt and the bulk density thereof was 0.574 g/cc. The product was found to be granules or lumps. By subjecting the product to steam activation, lump or granular activated carbon was obtained with a good yield.

EXAMPLES 10–14

In Examples 10 and 11, activated carbons were produced in the same manner as described in Example 9. In the pre-treatment step of Example 11, however, the reaction medium, 1,1,2-trichloroethane, was recovered by distillation after the reaction was over.

In Examples 12, 13 and 14 activated carbons were produced in the same manner as described in Example 7 while using as the sulfonating agent chlorosulfonic acid (concentration 97%), mixture of 25 parts by weight of 96% concentrated sulfuric acid and 1 part by weight of potassium permanganate, and a mixture of 96% concentrated sulfuric acid and 60% nitric acid in the same weight ratio, respectively. In the case of using a sulfonating agent only, an oxidation reaction occurred in addition to a sulfonation but in the case of using a mixture of the sulfonating agent and an oxidizing agent such as potassium permanganate or nitric acid as in Examples 13 and 14, the pre-treatment reaction could be conducted effectively, a hard product could be obtained, and also the activated carbon could be obtained with a good yield. The results obtained in the examples are shown in Table 2.

Table 2

| | Example | 7 | 8 | 9 | 10 | 11 | 12 | 13 | 14 |
|---|---|---|---|---|---|---|---|---|---|
| | Sulfonating Agent | 25% Fuming Sulfuric acid | 60% Fuming Sulfuric acid | Sulfur trioxide | | | Chlorosulfonic acid | Sulfuric acid + KMnO₄ | Sulfuric acid + nitric acid |
| Pre-treatment Step | Sulfonating Agent/ Raw Material (w/w) | 3/1 | 3/1 | 2.1/1 | 2.2/1 | 2.4/1 | 5/1 | 5/1 | 4/1 |
| | Reaction Medium | TCE | TCE | TCE | TCE | TCE | TCE | TCE | TCE |
| | Reaction Medium/ Raw Material (w/w) | 10/1 | 5/1 | 10/1 | 5/1 | 10/1 | 10/1 | 10/1 | 10/1 |
| | Reaction Temperature (°C) | 113–116 | 113–116 | 90 | 90 | 113–116 | 113–116 | 113–116 | 113–116 |
| | Reaction Time (hr) | 3.0 | 3.0 | 3.0 | 3.0 | 3.0 | 3.0 | 3.0 | 3.0 |
| | Reaction Product: Yield (wt%) | 134 | 168 | 145 | 132 | 145 | 168 | 146 | 136 |
| | Bulk Density (g/cc) | 0.551 | 0.453 | 0.574 | 0.523 | 0.592 | 0.632 | 0.510 | 0.554 |
| | Activation Temperature (°C) | 900 | 850 | 850 | 850 | 850 | 850 | 850 | 850 |

Table 2-continued

| Example<br>Sulfonating Agent | | 7<br>25%<br>Fuming<br>Sulfuric<br>acid | 8<br>60%<br>Fuming<br>Sulfuric<br>acid | 9 | 10<br>Sulfur trioxide | 11 | 12<br>Chloro-<br>sulfonic<br>acid | 13<br>Sulfuric<br>acid<br>+ $KM_nO_4$ | 14<br>Sulfuric<br>acid<br>+ nitric<br>acid |
|---|---|---|---|---|---|---|---|---|---|
| Acti-<br>vation<br>Step | Activation Time(min)<br>Activated Carbon:<br>Yield (wt%)<br>Specific Surface<br>Area (m²/g)<br>Methylene Blue-<br>Adsorptive Power<br>(mg/g)<br>Bulk Density (g/cc) | 60<br><br>30.2<br>1700<br><br>410<br><br>0.387 | 50<br><br>26.9<br>1700<br><br>400<br><br>0.381 | 40<br><br>25.2<br>1500<br><br>350<br><br>0.402 | 30<br><br>29.7<br>1500<br><br>360<br><br>0.384 | 35<br><br>24.1<br>1600<br><br>380<br><br>0.474 | 50<br><br>25.5<br>1600<br><br>390<br><br>0.439 | 40<br><br>26.7<br>1800<br><br>450<br><br>0.394 | 35<br><br>27.2<br>1700<br><br>440<br><br>0.411 |

EXAMPLES 15–18

Examples 15–18, activated carbons were produced in the same manner as described in Example 7 while using dimethylformamide, dioxane, acetic acid, and benzene, respectively as the reaction medium.

In each case of the examples, granular activated carbon having a large specific surface area and a good methylene blue-adsorptive power was obtained with a good yield. The results obtained in the examples are shown in Table 3.

EXAMPLE 19 cible, the temperature of the system was raised from room temperature to 630°C. at a rate of 3°C/min. After maintaining the system at 630°C for one hour, the product was allowed to cool in a desiccator. Then, the product was cleaned using 100 ml of boiling hydrochloric acid having a concentration of about 10% and the cleaning operation was repeated 7 times. The product was then washed with warm water and dried. The amount of the product was 9.5 g. The methylene blue-adsorptive power of the product was 560 mg/g and the specific surface area thereof was 2200 m²/g.

The results of this invention are also shown in Table 3.

Table 3

| Example<br>Sulfonating Agent | | 15 | 16<br>25% Fuming sulfuric Acid | 17 | 18 | 19<br>Industrial<br>concentrated<br>sulfuric acid |
|---|---|---|---|---|---|---|
| Pre-<br>treat-<br>ment<br>Step | Sulfonating Agent/<br>Raw Material (w/w)<br>Reaction Medium<br>Reaction Medium/<br>Raw Material (w/w)<br>Reaction Tempe-<br>rature (°C)<br>Reaction Time (hr)<br>Reaction Product:<br>Yield (wt%)<br>Bulk Density (g/cc)<br>Activation Tempe-<br>rature (°C) | 3/1<br>dimethyl-<br>formamide<br>10/1<br>150–155<br>3.0<br>138<br>0.482<br>900 | 3/1<br>Dioxane<br>10/1<br>100–101<br>3.0<br>133<br>0.440<br>900 | 3/1<br>Acetic Acid<br>10/1<br>115–118<br>3.0<br>135<br>0.505<br>900 | 3/1<br>Benzene<br>10/1<br>80<br>5.0<br>132<br>0.550<br>900 | 6/1<br>TCE<br>4/1<br>110<br>6.0<br>125<br>0.450<br>630 |
| Acti-<br>Step | Activation Time(min)<br>Activated Carbon:<br>Yield (wt%)<br>Specific Surface<br>Area (m²/g)<br>Methylene Blue<br>Adsorptive Power<br>(mg/g)<br>Bulk Density(g/cc) | 60<br><br>22.2<br>1400<br><br>250<br><br>0.401 | 60<br><br>24.1<br>1600<br><br>320<br><br>0.355 | 60<br><br>28.3<br>1700<br><br>440<br><br>0.411 | 60<br><br>30.4<br>1700<br><br>410<br><br>0.463 | 60<br><br>47.5<br>2200<br><br>560<br><br>0.398 |

To 2000 g of 1,1,2-trichloroethane was added 500 g of asphalt as described in Example 1 and the mixture was heated while refluxing 1,1,2-trichloroethane. After ending to the mixture 3000 g of industrial concentrated sulfuric acid followed by reflux for 2 hours, 1,1,2-trichloroethane began to be distilled off. After 4 hours, 1685 g of 1,1,2-trichloroethane was recovered. The reaction product was added to 2000 ml of water, the solid matter was separated from the liquid by filtration, washed with water and dried. The yield of the product thus obtained was 125% by weight to the asphalt and the bulk density thereof was about 0.450 g/cc.

A mixture of 20 g of the product thus obtained and 60 ml of an activator consisting of 50 ml of water, 50 g of zinc chloride, and 5 ml of concentrated hydrochloric acid was placed in a crucible and after closing the cru-

EXAMPLES 20–25

In Examples 20–25, the following procedure was conducted using chloroform, carbon tetrachloride, 1,1,1-trichloroethane, perchloroethylene (tetrachloroethylene), 1,1,1,2-tetrachloroethane, and pentachloroethane were used as the reaction mediums respectively. That is, 50 g of asphalt as in Example 1 was dissolved in 500 g of each of the reaction mediums and then 50–75 g of 60% fuming sulfuric acid was added dropwise to the solution over a period of 20 minutes. Thereafter, the reaction medium was distilled off over a period of 2 or 3 hours while the reaction temperature was maintained at temperatures near the boiling point of each of the reaction mediums to cause the reaction. After the reaction medium was distilled off, the reaction product was heated to 180°C for 2 hours with stirring and then the remaining sulfonating agent was decomposed and removed and the reaction product was dried in the reaction vessel. By subjecting the product to a steam activation for 30 minutes at 850°C, granular or crushed active carbon having a good specific surface area and methylene blue-adsorptive power could be obtained with a good yield. The results obtained in the aforesaid Examples 20–25 are shown in Table 4.

parts by weight of 1,1,1-trichloroethane and 50 parts by weight of perchloroethylene, a mixture of 50 parts by weight of 1,1,1-trichloroethane and 50 parts by weight of 1,1,2-trichloroethane, a mixture of 50 parts by weight of 1,1,2-trichloroethane and 50 parts by weight of perchloroethane, and a mixture of 75 parts by weight of 1,1,2-trichloroethane and 25 parts by weight of 1,1,1,2-tetrachloroethane, respectively.

In each of the examples granules of crushed activated

Table 4

| | Example | 20 | 21 | 22 | 23 | 24 | 25 |
|---|---|---|---|---|---|---|---|
| | Sulfonating Agent | | | 60% Fuming sulfuric acid | | | |
| Pre treat- ment Step | Sulfonating Agent/ Raw Material (w/w) | 1/1 | 1/1 | 1/1 | 1/1 | 1/1 | 1.5/1 |
| | Reaction Medium | Chloroform | Carbon tetra chloride | 1,1,1-Tri- chlorethane | Perchlor- ethylene | 1,1,1,2- Tetrachlor- ethane | Pentachlor- ethane |
| | Reaction Medium/ Raw Material (w/w) | 10/1 | 10/1 | 10/1 | 10/1 | 10/1 | 10/1 |
| | Reaction Temperature (°C) | 60 | 70 | 70 | 100 | 100 | 100 |
| | Reaction Time(hr) | 3.0 | 3.0 | 2.0 | 2.0 | 2.0 | 2.0 |
| | Reaction Product: Yield (wt%) | 128 | 130 | 133 | 135 | 138 | 140 |
| | Bulk Density (g/cc) | 0.437 | 0.440 | 0.489 | 0.503 | 0.622 | 0.685 |
| Acti- vation Step | Activation Tempe- rature (°C) | 850 | 850 | 850 | 850 | 850 | 850 |
| | Activation Time (min) | 30 | 30 | 30 | 30 | 30 | 30 |
| | Activated Carbon: yield (wt%) | 30.2 | 25.7 | 25.2 | 28.0 | 35.0 | 31.5 |
| | Specific Surface Area (m²/g) | 1400 | 1500 | 1500 | 1700 | 1700 | 1600 |
| | Methylene Blue Adsorptive Power (mg/g) | 310 | 370 | 350 | 400 | 430 | 390 |
| | Bulk Density (g/cc) | 0.354 | 0.386 | 0.414 | 0.458 | 0.512 | 0.538 |

EXAMPLES 26–29

In Examples 26–29, activated carbons were produced in the same manner as described in Examples 20–25 using as the reaction medium a mixture of 50 carbon having a large specific surface area and a high methylene blue-adsorptive power was obtained. The results obtained in Examples 26–29 are shown in Table 5.

Table 5

| | Example | 26 | 27 | 28 | 29 |
|---|---|---|---|---|---|
| | Sulfonating Agent | | 60% Fuming sulfuric acid | | |
| | Sulfonating Agent/Raw Material (w/w) | 1/1 | 1/1 | 1/1 | 1/1 |
| Pre- treat- ment step | Reaction medium | 1,1,1-Tri- chloro- ethane / Per- chloro- ethylene | 1,1,1-Tri- chloro- ethane / 1,1,2- Tri- chloro- ethane | 1,1,2-Tri- chloro- ethane / Per- chloro- ethylene | 1,1,2-Tri- chloro- ethane / 1,1,1,2- Tetra- chloro- ethane |
| | Mixture Ratio (w/w) | 50/50 | 50/50 | 50/50 | 75/25 |
| | Reaction Medium Raw Material (w/w) | 10/1 | 10/1 | 10/1 | 10/1 |
| | Reaction Tempera- ture(°C) | 70 | 70 | 100 | 100 |
| | Reaction Time (hr) | 2.5 | 2.5 | 2.5 | 3.5 |
| | Reaction Product: Yield (St%) | 128 | 135 | 130 | 135 |
| | Bulk Density (g/cc) | 0.490 | 0.533 | 0.523 | 0.558 |
| Acti- | Activation Tempera- ture(°C) | 850 | 850 | 850 | 850 |
| | Activation Time (min) | 30 | 30 | 30 | 30 |
| | Activated Carbon: | | | | |

Table 5-continued

| Example | | 26 | 27 | 28 | 29 |
|---|---|---|---|---|---|
| vation step | Yield (wt%) | 25.3 | 24.7 | 26.1 | 28.0 |
| | Specific Surface Area (m²/g) | 1500 | 1500 | 1800 | 1900 |
| | Methylene Blue Adsorptive Power(mg/g) | 320 | 360 | 470 | 500 |
| | Bulk Density (g/cc) | 0.399 | 0.455 | 0.412 | 0.481 |

While the invention has been described in detail and with reference to specific embodiments thereof, it will be apparent to one skilled in the art that various changes and modifications can be made therein without departing from the spirit and scope thereof.

What is claimed is:

1. A method of producing a granular activated carbon from a petroleum heavy oil or heavy residue which is solid at room temperature or liquid having a kinematic viscosity higher than 100 centistokes at 50°C and contains more than 70% by weight of carbon and not more than 0.1% by weight of total metal content, which process comprises adding a liquid, organic reaction medium material which can dissolve or disperse said petroleum heavy oil or heavy residue and is selected from the group consisting of halogenated lower aliphatic compounds, lower fatty acids, lower amides, dioxane, carbon disulfide and benzene into said petroleum heavy oil or heavy residue in an amount of 5 to 20 times by weight the amount of said petroleum heavy solid or heavy residue therein; adding a sulfonating agent capable of sulfonating said petroleum heavy oil or heavy residue into the resulting mixture in an amount of 0.2 to 20 times by weight the amount of said petroleum heavy oil or heavy residue; reacting the resulting mixture at a temperature of about 50° to about 155°C for from 30 minutes to 10 hours to conduct simultaneously sulfonation, oxidation and dehydro-poly-condensation reactions with said heavy oil or heavy residue, whereby said petroleum heavy oil or heavy residue is converted into a granular carbonized material which is not softened by an activation treatment; separating said liquid, organic reaction medium material and residual sulfonating agent from the carbonized material produced and activating the thus obtained carbonized material.

2. The method as claimed in claim 1, wherein said petroleum heavy material is asphalt.

3. The method as claimed in claim 1, wherein said petroleum heavy material is at least one member selected from the group consisting of a catalytic decomposition residue of heavy oil, a catalytic decomposition residue of kerosene, a catalytic decomposition residue of light oil, a thermal decomposition residue of kerosene, a thermal decomposition residue of light oil, a naphtha decomposition residue, a residue obtained in thermal decomposition of a heavy fraction, a residue obtained in gasifying of a heavy fraction, a residue obtained in hydrocracking of a heavy fraction, a residue obtained in thermal decomposition of a residual oil, a residual obtained in gasifying of a residual oil, a residue obtained in hydrocracking of a residual oil and a petroleum pitch.

4. The method as claimed in claim 1, wherein charcoal or coal is present with the petroleum heavy material, the proportion of said charcoal or coal being less than about 50% by weight based on the weight of the petroleum heavy material.

5. The method as claimed in claim 1, wherein said sulfonating agent is fuming sulfuric acid.

6. The method as claimed in claim 1, wherein said sulfonating agent is sulfur trioxide.

7. The method as claimed in claim 1, wherein said sulfonating agent is chlorosulfonic acid.

8. The method as claimed in claim 1, wherein said sulfonating agent is concentrated sulfuric acid.

9. The method as claimed in claim 1, wherein said sulfonating agent is a complex salt obtained by reacting sulfuric trioxide with a compound selected from the group consisting of pyridine, dioxane, trimethylamine, dimethylaniline, thioxane, bis-(2-chloroethyl)ether, 2-methylpyridine, quinoline, dimethylformamide and triester phosphate, or a complex salt obtained by reacting chlorosulfonic acid with a compound selected from the group consisting of diethylether, dioxane and dimethylformamide.

10. The method as claimed in claim 1, wherein said reaction medium is a halogenated lower aliphatic compound.

11. The method as claimed in claim 10, wherein said reaction medium is dichloromethane.

12. The method as claimed in claim 10, wherein said reaction medium is 1,1,2-trichloroethane.

13. The method as claimed in claim 10, wherein said reaction medium is 1,1,2,2-tetrachloroethane.

14. The method as claimed in claim 1, wherein said reaction medium is dimethylformamide.

15. The method as claimed in claim 1, wherein said reaction medium is dioxane.

16. The method as claimed in claim 1, wherein said reaction medium is acetic acid.

17. The method as claimed in claim 1, wherein said reaction medium is benzene.

18. The method as claimed in claim 10, wherein said reaction medium is chloroform.

19. The method as claimed in claim 10, wherein said reaction medium is carbon tetrachloride.

20. The method as claimed in claim 10, wherein said reaction medium is 1,1,1-trichloroethane.

21. The method as claimed in claim 10, wherein said reaction medium is perchloroethylene.

22. The method as claimed in claim 10, wherein said reaction medium is 1,1,1,2-tetrachloroethane.

23. The method as claimed in claim 10, wherein said reaction medium is pentachloroethylene.

24. The method as claimed in claim 10, wherein said reaction medium is a mixture of two halogenated lower aliphatic compounds.

25. The method as claimed in claim 24, wherein said reaction medium is a mixture of 1,1,1-trichloroethane and perchloroethylene.

26. The method as claimed in claim 24, wherein said reaction medium is a mixture of 1,1,1-trichloroethane and 1,1,2-trichloroethane.

27. The method as claimed in claim 24, wherein said reaction medium is a mixture of 1,1,2-trichloroethane and perchloroethane.

28. The method as claimed in claim 24, wherein said reaction medium is a mixture of 1,1,2-trichloroethane and 1,1,1,2-tetrachloroethane.

29. The method as claimed in claim 1, wherein said reaction is conducted at temperatures of 50° to 150°C.

30. The method as claimed in claim 1, wherein said reaction is conducted for 1 to 5 hours.

31. The method as claimed in claim 1, wherein said petroleum heavy material and said sulfonating agent are reacted until the softening point of said carbonized material produced becomes higher than 900°C.

32. The method as claimed in claim 1, wherein said sulfonating agent is selected from the group consisting of fluorosulfonic acid, sulfoallyl chloride, sulfamic acid, an acyl sulfate and an alkyl sulfate.

* * * * *